Jan. 19, 1971    C. R. CHUTE    3,555,729
PLANT RECEPTACLE
Filed Jan. 17, 1969    2 Sheets-Sheet 1

INVENTOR
CHALLONER R. CHUTE

BY Shoemaker and Mattare
ATTORNEYS

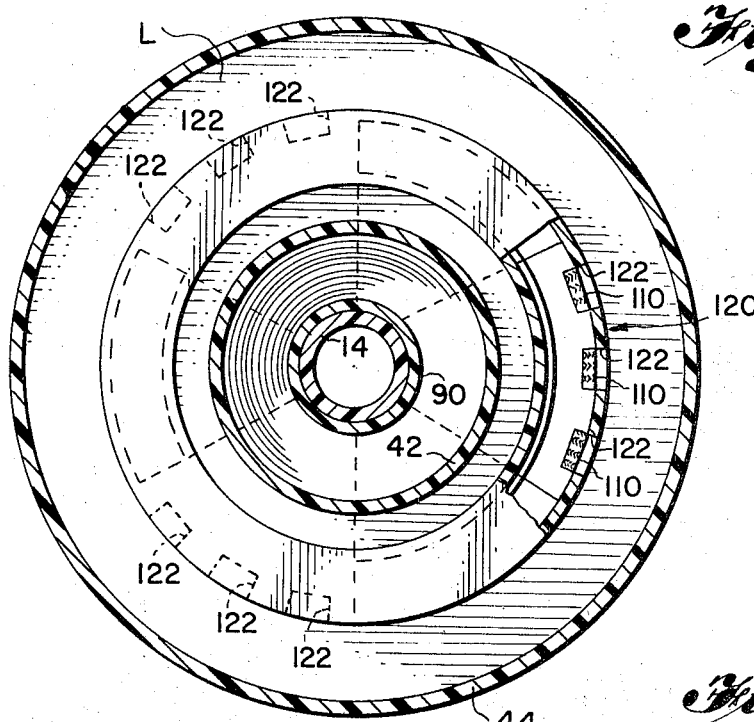
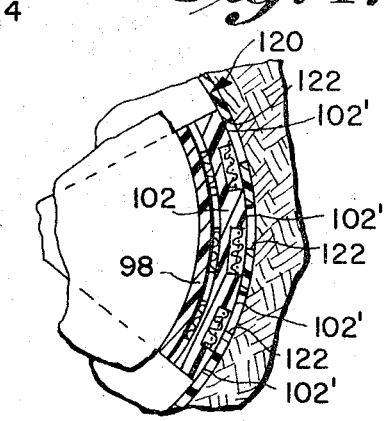
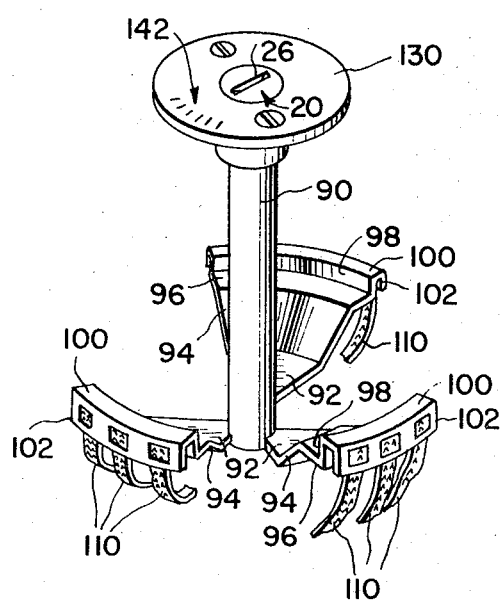
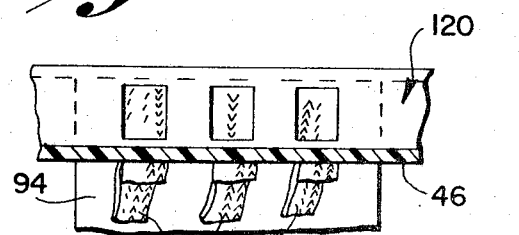
INVENTOR
CHALLONER R. CHUTE
BY Shoemaker and Mattare
ATTORNEYS

United States Patent Office 3,555,729
Patented Jan. 19, 1971

3,555,729
PLANT RECEPTACLE
Challoner R. Chute, 918 Rugby Road,
Charlottesville, Va. 22903
Filed Jan. 17, 1969, Ser. No. 791,911
Int. Cl. A01g 27/00
U.S. Cl. 47—38.1                    10 Claims

ABSTRACT OF THE DISCLOSURE

A base portion is adapted to receive liquid and includes an integral upwardly extending tubular portion. An intermediate portion is locked onto the base portion and defines a space for receiving soil. An upper portion is supported on said intermediate portion. A wetting support means includes a tubular portion surrounding said first tubular portion and carries a plurality of wicks which are disposed within a downwardly facing channel means defined by said intermediate portion. This channel means has spaced holes formed therein which are adapted to be selectively aligned or misaligned with the wicks for controlling the amount of wetting of the soil.

CROSS-REFERENCE TO RELATED APPLICATIONS

The present invention represents an improvement over the arrangement disclosed in U.S. patent application Ser. No. 600,552, filed Dec. 9, 1966.

BACKGROUND OF THE INVENTION

The invention relates to a receptacle within which any type of plant is adapted to be planted in the soil supported by the receptacle, and wherein means is provided for continuously wetting the soil so that the plants will be properly nourished. The apparatus is designed so that it may be readily assembled and disassembled for filling the device with water or for replacing components thereof when required.

The present invention represents an improvement over a plant receptacle such as shown in U.S. Pat. 3,222,819. This prior art patent also discloses a plant receptacle composed of a plurality of parts which may be readily assembled and disassembled. This type of prior art plant receptacle is designed to be suspended from a suitable hanger mechanism. The structure and aesthetic appearance thereof is such that it can only be feasibly used in its suspended position. The arrangement is such that the apparatus is not sufficiently stable to be supported on its base, and it is of such a construction as to present a good appearance only when hanging from some supporting structure.

A further problem with the arrangement as shown in this U.S. patent is the fact that if the structure should be accidentally tipped over, liquid can readily run out of the apparatus through the central tubular filling stem. Additionally, the water level is indicated by a float mechanism since it is not possible to visually inspect the liquid level in the base of the apparatus unless it is completely disassembled. This is disadvantageous since this float mechanism tends to become wedged in the central stem so that it does not accurately indicate the liquid level.

A further disadvantage of the arrangement shown in the aforementioned U.S. patent is the fact that there is a direct air passage through the central stem from the liquid in the base portion to atmosphere. This results in excessive evaporation of liquid from the apparatus so that it must be refilled quite often.

In the arrangement shown in U.S. patent application Ser. No. 600,552, porous wick means is provided for wetting the soil in the recptacle. The arrangement as shown in this application does not permit precise control of the amount of wetting action. There is considerable variation of soil and plant water loss through evaporation. Some plants require a dry soil while others need a damp or saturated soil. Ambient conditions both in a house and outside also vary. In colder climates and in wintertime when central heating is used, the atmosphere is low in humidity, and thus the receptacle has to supply water at a faster rate than in higher humidity conditions as exist for example in the summertime.

It is accordingly necessary to provide an arrangement wherein the amount of wetting of the soil can be readily and accurately controlled for optimum growth conditions.

SUMMARY OF THE INVENTION

In the present invention, the apparatus includes a construction which permits it to be readily employed more or less as a pot resting on a supporting surface wherein it is not suspended from any overhanging structure. In order to accomplish this, the base portion of the present invention is provided with a substantial flat bottom area, and the configuration of the apparatus is such as to resemble a conventional pot rather than being more or less bottle-shaped as in the aforementioned U.S. patent.

Although the apparatus of the present invention is adaptable for use resting on a supporting surface, it may be readily converted for use wherein it is suspended from a suitable hanger means. The base portion of the present invention includes an integral tubular portion which is threaded at the upper end thereof for receiving a hanger fitting. This open upper end of the tubular portion is normally closed off by a plug means so as to prevent the entrance of foreign matter into the tubular portion and to present a pleasing finished appearance to the structure.

The provision of this integral tubular portion also enables the apparatus to be further converted into a lamp wherein the structure serves as the lamp base, and the electrical cord for the lamp may pass upwardly through the integral tubular portion and through an extension attached thereto so that a very neat appearing and aesthetically pleasing lamp arrangement may be provided.

The intermediate portion of the present invention includes an inner wall having a downwardly and inwardly tapering portion extending towards the base portion so that if the apparatus is accidentally tipped over, this downwardly and inwardly tapering portion will tend to prevent liquid from leaking out of the apparatus. In addition, the filling arrangement is such that when the annular closure means provided between the upper portion and the integral tubular portion of the structure is removed, the liquid level can be visually examined so as to readily determine the liquid level without the necessity of providing a float mechanism. The annular filling opening provided at the upper portion of the structure is also substantially larger than that afforded in an arrangement as shown in the aforementioned U.S. patent so as to facilitate filling of the apparatus.

The closure means also enables the structure to be sealed off so that there is no direct air channel from the body of liquid in the base portion and the surrounding atmosphere to thereby substantially reduce the evaporation occurring under normal operating conditions.

In addition, the present invention incorporates wetting support means which supports a plurality of porous wicks. These porous wicks are disposed within a downwardly facing channel means formed in the intermediate portion of the receptacle. This channel means includes a plurality of spaced holes. The wetting support means is adapted to be rotated with respect to the intermediate portion so as to align or misalign the porous wicks with the holes in the channel means for selectively increasing or decreasing the wetting of the soil.

Suitable cooperating indicia are provided at the upper portion of the receptacle whereby the amount of wetting can be readily adjusted without the necessity of visually inspecting the interior of the receptacle. Accordingly, very accurate control of the amount of wetting may be obtained at all times.

BRIEF DESCRIPTION OF THE DRAWINGS

FIG. 3 is a sectional view taken substantially along line 3—3 of FIG. 2 looking in the direction of the arrows;

FIG. 4 is a sectional view illustrating a particular relationship of a wetting support means portion with respect to the associated channel means;

FIG. 5 is a top perspective view illustrating the wetting support means of the present invention; and FIG. 6 is a sectional view taken substantially along line 6—6 of FIG. 2 looking in the direction of the arrows.

DESCRIPTION OF THE PREFERRED EMBODIMENT

Figure 1:
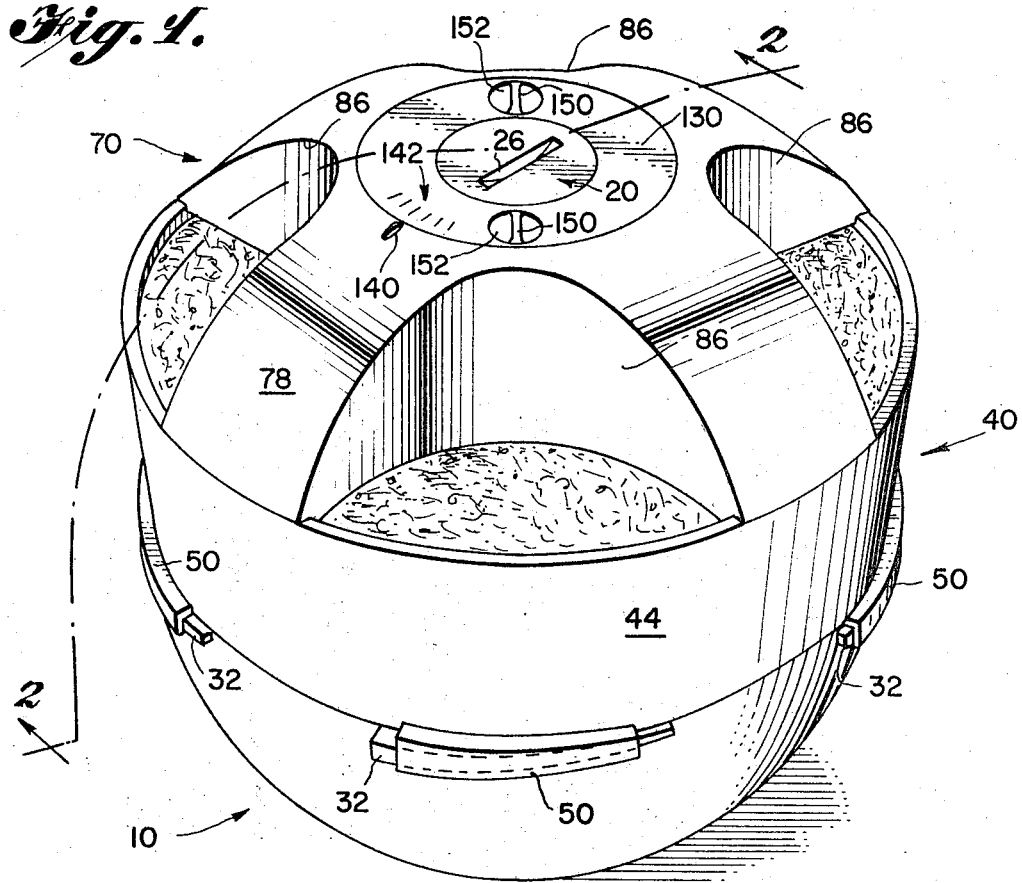
FIG. 1 is a top perspective view of a plant receptacle according to the present invention.

Referring now to the drawings wherein like reference characters designate corresponding parts throughout the several views, the plant receptacle of the present invention includes a base portion indicated generally by reference numeral 10. The base portion includes a bottom wall 12 having a substantial area defining a flat undersurface whereby the base portion is adapted to effectively support the apparatus on an underlying support surface so that it will be stable and will not readily tip over. This base portion includes an integral upwardly extending tubular portion 14 which is open at the lower end 16 thereof and which is also open at the upper end 18 thereof.

The open upper end of the integral tubular portion is provided with internal threads, and a plug 20 includes a threaded portion 22 which is threaded into the open upper end of the tubular portion. This plug also includes a radially outwardly extending peripheral flange 24 for a purpose hereinafter described. A kerf 26 is provided in the upper surface of the plug for receiving suitable means for threading and unthreading the plug when so desired.

The bottom wall 12 of base portion 10 joins with an arcuate upwardly sloping side wall portion 30, this side wall portion having four equally spaced cam lugs 32 formed integrally therewith and extending outwardly thereof. As seen most clearly in FIG. 1, the undersurface of each of the cam lugs 32 slopes downwardly in a circumferential direction from right to left as seen in FIG. 1 so as to provide a cam undersurface which cooperates with similar cam surfaces formed on the intermediate portion hereinafter described.

Figure 2:
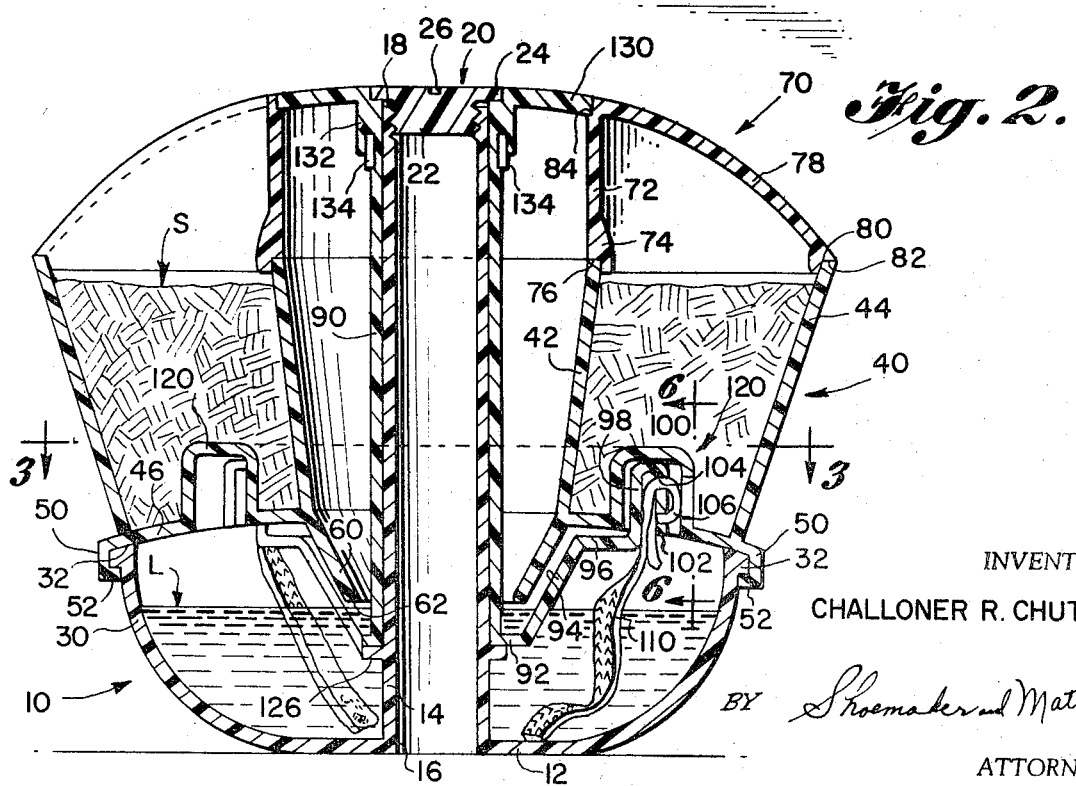
FIG. 2 is a sectional view taken substantially along line 2—2 of FIG. 1 looking in the direction of the arrows.

The various portions of the apparatus of the present invention are formed of a suitable substance such as polypropylene plastic or the like, and as seen in FIG. 2, a body of liquid indicated by reference character L is disposed within the base portion for wetting the soil supported in the intermediate portion hereinafter described.

An intermediate portion indicated generally by reference numeral 40 includes an inner wall 42 disposed in spaced surrounding relationship to the integral tubular portion 14, this inner wall 42 being of generally frustoconical configuration as seen in FIG. 2. An outer wall 44 of the intermediate portion is disposed in spaced surrounding relationship to the inner wall 42 and is generally parallel therewith although it may have a slightly greater slope as seen in FIG. 2. The inner and outer walls 42 and 44 respectively are joined by a bottom wall 46 whereby an annular space is provided for receiving the soil indicated by reference character S within the intermediate portion.

The intermediate portion 40 is provided with four equally spaced outwardly extending lug portions 50 each of which extends downwardly from the intermediate portion and includes an inwardly extending lower portion 52 as seen most clearly in FIG. 2. The upper surface of portion 52 slopes downwardly in a circumferential direction so as to cooperate with the undersurface 34 of the cam lugs provided on the base portion whereby upon relative rotation of the intermediate portion in a clockwise direction with respect to the base portion as seen in the drawings, the intermediate portion will be drawn down tightly on the base portion so as to provide a fluid-tight seal therewith.

The inner wall of the intermediate portion includes a downwardly and inwardly tapering portion 60 terminating in a lower end 62 which is disposed in spaced surrounding relationship to the integral tubular portion 14 to provide an annular filling space through which liquid is adapted to pass downwardly into the base portion. This inner wall portion 60 also provides a safety factor such that if the receptacle should accidentally tip over, this portion 60 will resist the tendency of the liquid within the base portion to leak outwardly thereof.

An upper portion indicated generally by reference numeral 70 includes an inner wall portion 72 disposed in spaced surrounding relationship to the upper end of the tubular portion 14. Wall portion 72 includes a thickened lower portion 74 having an annular cutout portion 76 formed in the inner surface thereof for receiving the upper end of the inner wall 42 of the intermediate portion for accurately positioning the upper portion thereon.

Upper portion 70 also includes an arcuate outer wall portion 78 which provides a substantial dome-shaped to the upper surface of the upper portion. The lower end of outer wall portion 78 terminates in a thickened portion 80 having a peripherally extending recess 82 therein for receiving the upper end of the outer wall 44 of the intermediate portion whereby the upper portion is accurately and positively held in place. The upper part of the inner surface of wall 72 of the upper portion is provided with a circumferentially extending recess 84 for a purpose hereinafter described.

As seen most clearly in FIG. 1, the outer wall 78 of the upper portion 70 defines a plurality of spaced recesses or pockets 86 shown as being four in number. It is apparent that any suitable number of recesses may be provided as desired. The areas defined by recesses 86 are adapted to receive plants which are supported within the soil disposed within the intermediate portion. It is evident that these recesses provide access to the soil in the intermediate portion from the exterior of the apparatus when the upper portion is in operative position as shown. It is evident that the upper portion may be simply lifted off of the operative position illustrated if so desired. The dimensions of the upper portion and intermediate portion may be such that the upper portion is adapted to be snugly fitted within the intermediate portion so as to be retained in operative position by the friction between the parts, and yet at the same time be readily manually removable.

Referring now particularly to FIG. 5, the wetting support means of the present invention includes a tubular portion 90 having three equally angularly spaced support portions extending from the lower end thereof. Each of these support portions includes a radially outwardly extending first portion which joins with an upwardly sloping portion 94 disposed substantially parallel with the aforementioned portion 60 of the intermediate part of the receptacle as seen in FIG. 2.

Each of the portions 94 joins with a radially outwardly extending portion 96 which in turn joins with an upwardly extending portion 98. This portion 98 in turn joins with a radially outwardly extending portion 100 which terminates in a depending portion 102 disposed substantially parallel to the portion 98. It will be noted as seen in FIG. 5 that each of these spaced wetting support portions is of substantially pie-shaped configuration as seen from above.

As seen most clearly in FIG 2, the portion 102 of each of the wetting support portions has a pair of spaced slots 104 and 106 formed therethrough whereby the upper end of a porous wick 110 may be passed through the slots as seen in FIG. 2 so as to support the wick members in position with the lower parts thereof disposed within the liquid contained in the base portion of the receptacle.

As seen most clearly in FIG. 5, three spaced wetting support portions are provided, each of these portions supporting three spaced porous wicks. As seen in FIG. 4, it will be noted that the parts 102' of the depending portions 102 intermediate the wicks are thickened so that the wicks are effectively disposed within recesses formed in the outer periphery of the wetting support means for a purpose hereinafter described.

The uppermost parts of the three wetting support portions are disposed within a channel means 120 which opens downwardly and is formed integral with the bottom wall 46 of the intermediate portion of the receptacle. This channel means may be continuous in a circumferential direction so that the support means is adapted to be rotated therewith.

As seen most clearly in FIG. 3, the channel means is provided with a plurality of spaced holes 122 formed in the outwardly facing side thereof, the holes being disposed in three groups of three each so as to correspond to the position of the porous wicks.

These holes 122 are adapted to be aligned or misaligned with the wicks carried by the wetting support means whereby the amount of wick exposed to the soil within the receptacle can be altered, thereby enabling the amount of wetting of the soil to be accurately controlled.

As seen in FIG. 4, the wetting support means has been rotated with respect to the intermediate portions so that approximately one-half of each of the wicks will be exposed through an adjacent hole 122 in the channel means of the intermediate portion of the receptacle. It will also be noted as seen in FIG. 4 that the thickened portions 102' of the wetting support means portions are disposed so as to engage the inner surface of the outer wall of the channel means 120 to thereby prevent soil from passing through the holes 122.

Referring again to FIG. 2 of the drawings, it will be noted that the tubular portion 14 formed integral with the base part of the receptacle is provided with a circumferentially extending radially outwardly directed collar 126 upon which the portions 92 of the wetting support means are adapted to rest for supporting the wetting support means in operative position.

An annular closure means 130 is provided at the upper portion of the assembled receptacle as seen in FIG. 2, this closure support means having the outer periphery thereof resting within the cutout 84 previously described. The closure means 130 is provided with an integral depending cylindrical portion 132 which is adapted to fit snugly about the tubular portion 90. The plug 24 is also received within the central opening defined by the closure means.

A pair of keys 134 are provided integral with tubular portion 90 and are adapted to fit within keyways provided in the depending portion 132 of the closure means whereby the closure means is rotatably interconnected with the tubular portion 90, but may be moved vertically with respect thereto.

This particular interconnection of the closure means with the tubular portion 90 permits the elements to be assembled into the relationship shown in FIG. 2, and further enables the wetting support means to be rotated through the intermediary of the closure means when so desired.

As seen in FIG. 1, an indicator 140 is formed on the wall portion 78 of the upper part of the receptacle, and this indicator cooperates with indicia 142 provided on the closure means 130. When it is desired to adjust the amount of wetting of the soil within the receptacle, plug 20 is loosened, this plug normally serving in the position shown in FIG. 2 to clamp the wetting support means in a desired operative position.

After the plug 20 is loosened, the integral rib portions 150 extending across the central portions of diametrically opposite depressions 152 formed in the upper surface of the closure means are manually engaged, and the closure means can be selectively rotated for aligning the indicia 142 with the indicator 140 as required.

Rotation of the closure means will cause rotation of the tubular means 90 and the wicks carried thereby so that more or less of the wicks are exposed to the soil within the receptacle whereby the amount of wetting is selectively controlled.

When the wetting support means has been rotated into the desired adjusted position, the plug 20 may again be threaded downwardly to clamp the wetting support means into the operative position, and the components will assume the relationship shown in FIG. 2.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A plant receptacle comprising a base portion for receiving liquid, said base portion including an integral tubular portion extending upwardly therefrom, said receptacle including an intermediate portion supported by said base portion, said intermediate portion including inner and outer spaced walls and a bottom wall defining an annular space for receiving soil, said bottom wall including means to permit liquid passage therethrough, said receptacle including an upper portion supported by said intermediate portion, said upper portion defining open areas for receiving plants, and means supported on said tubular portion for wetting soil in the annular space of said intermediate portion with liquid from said base portion and comprising wetting support means, wetting members carried by said wetting support means, said wetting support means being rotatable with respect to said intermediate portion to move said member with respect to said liquid passage means to precisely control the amount of wetting of soil in the receptacle.

2. Apparatus as defined in claim 1 wherein said wetting support means includes a central tubular portion disposed in surrounding relationship to said first-mentioned tubular portion and being supported thereby.

3. Apparatus as defined in claim 2 wherein said second-mentioned tubular portion is rotatable with respect to said first tubular portion and carries a plurality of spaced wetting support portions.

4. Apparatus as defined in claim 2 including annular closure means disposed between the upper end of said second tubular portion and said upper portion of the receptacle.

5. Apparatus as defined in claim 4 wherein said closure means is connected for rotation with said second-mentioned tubular portion.

6. Apparatus as defined in claim 1 wherein said wetting members each comprise a porous wick means, said wetting support means carrying a plurality of said porous wick means disposed in spaced relationship to one another.

7. Apparatus as defined in claim 6 wherein said wetting support means includes a plurality of holes for receiving said wick means.

8. Apparatus as defined in claim 7 wherein said holes are disposed in recessed portions of said wetting support means.

9. Apparatus as defined in claim 1 wherein said intermediate portion defines a downwardly opening channel means, said wetting support means including portions extending upwardly within said channel means, said wetting members being supported by said wetting support means adjacent said channel means.

10. Apparatus as defined in claim 9 wherein said channel means has a plurality of spaced holes formed therethrough adapted to be aligned or misaligned with said wetting members for increasing or decreasing the amount of wetting of soil within the plant receptacle.

References Cited

UNITED STATES PATENTS

| 1,815,676 | 7/1931 | Medveczky | 47—38 |
| 2,865,137 | 12/1958 | Longacre | 47—38.1 |
| 3,222,819 | 12/1965 | Marcan | 47—38.1 |
| 3,455,055 | 7/1969 | Chute | 47—38.1 |

FOREIGN PATENTS

| 1,024,483 | 1/1953 | France | 47—38.1 |
| 1,168,485 | 12/1958 | France | 47—38.1 |
| 435,841 | 10/1967 | Switzerland | 47—38.1 |

ROBERT E. BAGWILL, Primary Examiner

U.S. Cl. X.R.

239—44, 50